United States Patent
Clapperton et al.

(10) Patent No.: US 8,362,872 B2
(45) Date of Patent: Jan. 29, 2013

(54) ELECTRONIC CONTROL SYSTEM

(75) Inventors: Alex John Clapperton, Poole (GB); David Huw Taylor, Sopley (GB)

(73) Assignee: P G Drives Technology Limited, Dorset (GB)

( * ) Notice: Subject to any disclaimer, the term of this patent is extended or adjusted under 35 U.S.C. 154(b) by 1048 days.

(21) Appl. No.: 11/279,403

(22) Filed: Apr. 12, 2006

(65) Prior Publication Data
US 2006/0235587 A1    Oct. 19, 2006

(30) Foreign Application Priority Data

Apr. 15, 2005   (GB) .................................. 0507740.9

(51) Int. Cl.
    G09B 21/00    (2006.01)
(52) U.S. Cl. .......................................... 340/4.1; 340/3.1
(58) Field of Classification Search .............. 340/825.19
    See application file for complete search history.

(56) References Cited

U.S. PATENT DOCUMENTS

| | | | |
|---|---|---|---|
| 5,418,726 A | | 5/1995 | Yagi |
| 5,556,226 A | * | 9/1996 | Hohmann, Jr. ............... 404/84.1 |
| 5,861,861 A | * | 1/1999 | Nolan et al. ................... 345/87 |
| 6,154,690 A | * | 11/2000 | Coleman ........................ 701/1 |
| 6,917,203 B1 | * | 7/2005 | Perotti et al. .................. 324/418 |
| 7,040,196 B2 | * | 5/2006 | Ormachea et al. ............. 81/57.4 |
| 2002/0003055 A1 | | 1/2002 | Leitner et al. |
| 2003/0007851 A1 | * | 1/2003 | Heigl et al. .................... 414/454 |
| 2003/0030790 A1 | * | 2/2003 | Rakucewicz ................... 356/128 |
| 2003/0144783 A1 | * | 7/2003 | Drummond et al. ............ 701/49 |
| 2006/0203746 A1 | * | 9/2006 | Maggenti et al. ............. 370/254 |
| 2006/0206252 A1 | * | 9/2006 | Katrak ............................ 701/70 |

FOREIGN PATENT DOCUMENTS

| | | |
|---|---|---|
| JP | 8128871 | 5/1996 |
| JP | 2003324807 | 11/2003 |
| JP | 2001103601 | 4/2004 |
| WO | WO95/29526 | 11/1995 |
| WO | WO 00/60424 | 10/2000 |

OTHER PUBLICATIONS

Ferworn et al, "The Network-Enabled Powered Wheelchair Adaptor Kit—First Prototype", Published May 2, 2003.*
Commando, The New Force in Powerchair Control, Commando Installation Manual, GBK38039, Jan. 2001, Issue 1.

* cited by examiner

Primary Examiner — Brian Zimmerman
Assistant Examiner — Omer S Khan
(74) Attorney, Agent, or Firm — Gordon & Jacobson, P.C.

(57) ABSTRACT

An electronic system has a controller device, at least one controller responsive device operating in response to the controller device, and at least one status indicating device arranged to provide a control status output. The response mode of operation of the controller responsive device is predetermined dependent upon the control status output of a predetermined one or more of the status indicating devices, the control status output being one of a predetermined plurality of different output modes.

19 Claims, 3 Drawing Sheets

ELECTRONIC CONTROL SYSTEM

This application claims priority from Great Britain Patent Application No. GB0507740.9 filed on Apr. 15, 2005.

BACKGROUND

1. Field of the Invention

The present invention relates to an electronic system and particularly but not exclusively to an electronic control system for a vehicle such as a wheelchair.

2. State of the Art

Electronic control systems are known in which a controller controls operation of output modules or power modules for a mechanical or other system. For example vehicles, such as wheelchairs, are known in which typically a joystick module can be connected to a power module to provide basic drive to the wheelchair. In more complex applications however, it is necessary to provide control for further modules such as seating control and lights control, all operable from the same controller. It is also important to ensure that systems permit operation in only safe modes, dependant upon the configuration or state of the system at any particular instance of demand from the controller.

SUMMARY OF THE INVENTION

An improved system has been devised.

In accordance with this invention as seen from a first aspect there is provided an electronic system comprising:
- a controller device;
- at least one controller responsive device operating in response to the controller device; and,
- at least one status indicating device arranged to provide a control status output,
- wherein the response mode of operation of a said controller responsive device is predetermined dependent upon the control status output of a predetermined one or more of said status indicating devices, the control status output being one of a predetermined plurality of different output modes.

The control status output of the said status indicating device is preferably dependent upon the status of an arrangement operated by a controller responsive device. The status of the arrangement may be indicative of orientation, motion, temperature, occupancy, or other characteristics. In an exemplary embodiment, the arrangement operated by the controller responsive device comprises a motive system such as a powered vehicle or powered re-configureable arrangement. The control status of the arrangement could relate to or be indicative of vehicle speed, break status, seat height, seat tilt and/or other characteristics.

It is preferred that, the control status output of the status indicating device is characterised by a plurality of discrete status levels. Beneficially, the control status is characterised by three or more discrete status levels. Desirably the discrete levels define bands having upper and/or lower thresholds.

The status outputs are typically broadcast throughout the system, typically via a bus arrangement. Broadcasting as discrete bands reduces the data traffic in the system.

In one embodiment the status levels may be determined with reference to the electrical impedance externally applied across the status indicating device. For example where the status indicating device is monitoring seat pressure, backrest angle and seat height of a powered wheelchair vehicle, the impedance will vary dependent upon the physical parameters and be output as different output bands dependant upon the impedance across the status indicating device. Where for example a limit switch is used resulting in an open or closed circuit the impedance will vary from maximum as one band to zero as another band. Where for example a mercury switch is used, a band can be assigned a debounce time falling within a defined range.

Preferably, the control status levels, bands or thresholds are programmable. This means that extra modules may be easily included in the system and operate in a desired manner with respect to other responsive devices in the system and in accordance with appropriate controller input.

In a simple envisaged embodiment, one controller responsive device is provided. The control status of one or more the relevant arrangements is ascertained using respective status indicating devices and characterised as within a specific one of a respective band of control status alternatives. The controller controls the responsive device to operate according to a regime programmed in accordance with the allocated status band. In this instance the status indicating devices can be assigned such that only one, or alternatively more than one, of the respective status indicating devices may influence operation of the controller responsive device.

In a more complex embodiment a plurality of controller responsive devices may be included. In such an embodiment the control status of a specific status indicating device (or a group of status indicating devices) could be assigned to influence the operation of a plurality of different responsive devices in a system in accordance with the invention. Combinations or groups of status indicating devices may have their status outputs assigned to specific controller responsive devices. Assignment may be in various combinations dependent upon the required operation of the system. The control status of a said status indicating device is preferably broadcast across the system to be communicated to other status indicating devices or control responsive devices in the system. Beneficially the status output is only caused to be notified when changing from one band to another. This further minimises system signal traffic. A system in accordance with the invention may include more than one controller device.

The status indicating devices may be mounted to controller responsive devices, controller devices or in other arrangements. It is possible that one or more dedicated status indicator device modules may be provided either for single devices, or more likely device arrays.

In accordance with this invention as seen from a second aspect there is provided a method of controlling an electronic system including a controller, one or more monitored devices, one or more status indicating devices, and one or more controller responsive devices, the method comprising:
i. determining a control status output from at least one of the status indicating devices monitoring a respective monitored device.
ii. controlling operation of at least one controller responsive device in a response mode which is dependent upon the determined control status output of one or more of said status indicating devices assigned to that respective controller responsive device.

In accordance with this invention as seen from a third aspect there is provided a status indicating device arranged to produce a control status output indicative of the control status of an electrical or electronic device or circuit, wherein the control status output comprises one of three or more control status bands.

Preferably, the output control status band is dependent upon the impedance applied externally across the status indicating device. Preferably, the band threshold levels and or bandwidths are programmable.

In accordance with this invention as seen from a fourth aspect there is provided an electronically controlled system comprising:

an operative arrangement arranged to be operated to be moved or reconfigured in a controlled manner;

at least one status indicating device arranged to provide a control status output dependent upon the status of the operative arrangement;

at least one driver device operating to move or reconfigure the operative arrangement;

wherein the response mode of operation of a said driver device is predetermined dependent upon the control status output of a predetermined one or more of said status indicating devices, the control status output being one of a predetermined plurality of different output modes.

In accordance with this invention as seen from a fifth aspect there is provided a vehicle comprising an electronic system, a status indicating device or a control system in accordance with the first aspect of the invention.

A preferred embodiment of this invention will now be described by way of example only and with reference to the accompanying drawings.

DETAILED DESCRIPTION OF THE PREFERRED EMBODIMENTS

Figure 1:
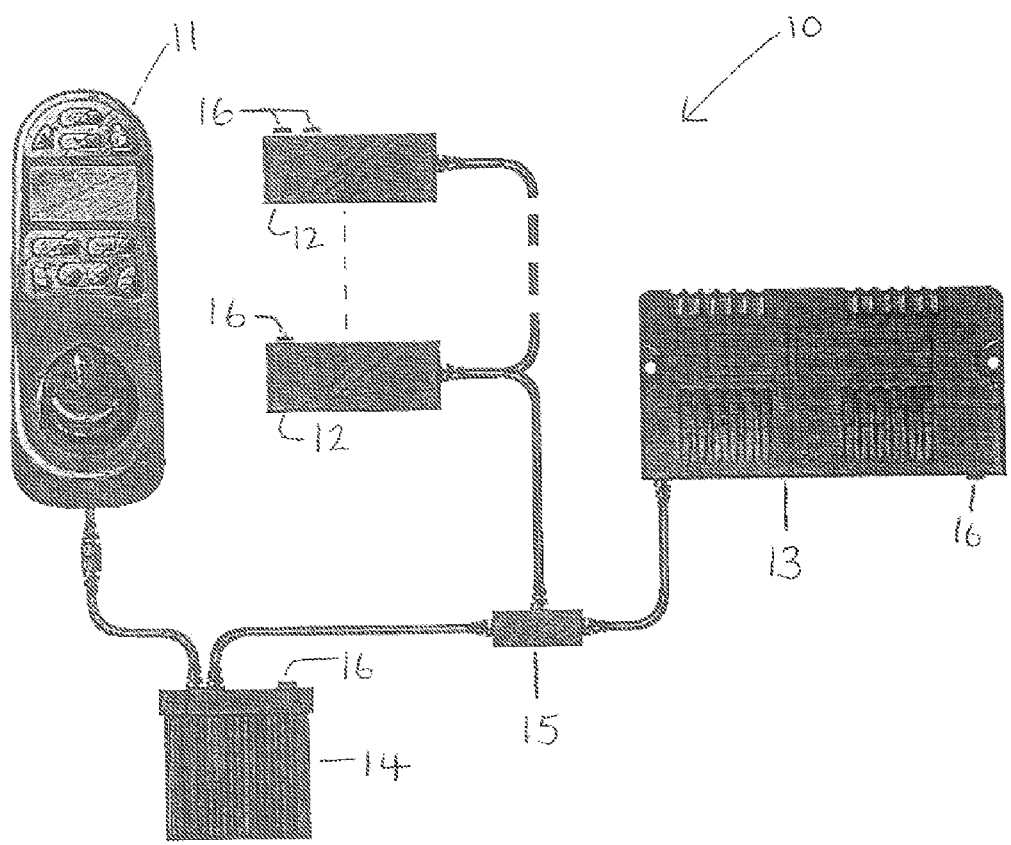
FIG. 1 is a schematic representation of the electronic system of the present invention.
Figure 3:
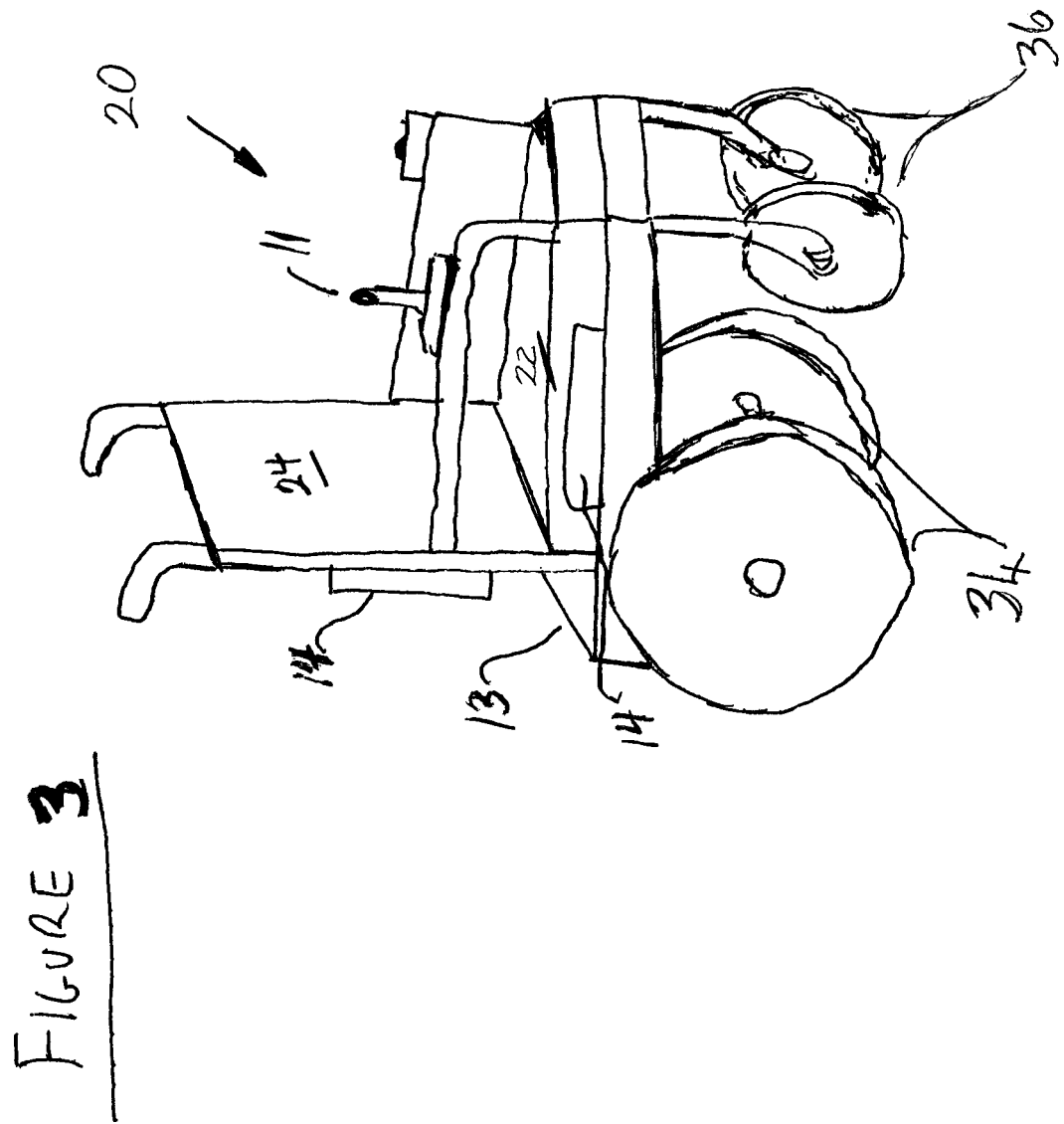
FIG. 3 is a schematic representation of a vehicle incorporating the electronic control systems of FIGS. 1 and 2.

Referring to FIG. 1, there is shown a control system 10 comprising a joystick controller device 11 and a plurality of controller responsive devices 12, 13, 14 arranged to respond to commands from the controller 11. In the drawings, module 13 is a power module and module 14 an intelligent seating module, able to modify tilt, attitude and orientation of the seating arrangement of a powered wheelchair 20 having back wheels 34 and front wheels 36 as seen in FIG. 3. Modules 12 as shown may be used for other purposes not specifically defined with respect to FIG. 1. The operation of each controller responsive device 12, 13, 14 is controlled by the controller 11, preferably via a bus based system 15, although a wireless system may be utilized.

The electronic system 10 is provided with one or more status indicating (SI) devices 16. The SI devices 16 are shown mounted to the controller responsive devices 12, 13, 14 but operably, and in practice need not be so mounted. For example all SI devices 16 could be mounted on a separate SI module (not shown). The devices 12, 13, 14 are designed to produce a control status output related to the impedance connected externally across the respective SI device and to communicate the control status output giving an indication of the status of the respective arrangement monitored by the respective SI device 16. The control status output from the SI devices 16 influences the behaviour of the devices 12, 13, 14 by tailoring the operational potential of the devices in accordance with a predetermined protocol regime. The controller responsive devices 12, 13, 14 of the system may be arranged such that a selected SI device 16 can influence the behaviour of a specific, assigned, respective responsive device, or a specifically assigned group of controller responsive devices to which that particular status indicating device is assigned. In this way SI devices 16 can be assigned to influence respective ones or groups of controller responsive devices 12, 13, 14 in the system 10. More than one SI device can be assigned to influence the operation of a controller responsive device 12, 13, 14.

The system is designed such that the control status output of each SI device 16 will be one of e.g., four status bands. In the preferred embodiment, the control status is determined by the electrical impedance of the physical arrangement connected across the SI device 16. For example in the arrangement shown in FIG. 2, an SI device monitors the impedance of an external circuit governing occupancy and orientation of the seat 22 of a wheel chair 20. By defining three discrete electrical impedance levels, four separate bands of control can be established such that each control band has an upper and lower impedance threshold. In this manner, the electrical impedance of the circuit shown in FIG. 2 will determine the control status output of the respective SI device.

The threshold electrical impedance for each control band can be pre-set or individually selected to tailor the status of control to the requirements of the user. The system is programmable to achieve this.

The SI devices 16 may be assigned to influence operation of any responsive devices in the system.

The system embodied in FIG. 1 is designed to accommodate up to 32 SI devices; each SI device 16 can be set up in the following way to create four control states presented to one or more responsive devices:

SI×Lower level threshold=$a$
SI×Middle level threshold=$b$
SI×Upper level threshold=$c$
SI×Debounce time=50 ms-500 ms where X can take any value from 2 to 33, and $0<a<b<c$ where $a$, $b$, and $c$ are pre-defined electrical impedance values. The debounce time is relevant to accurately reflect the status for certain devices such a mercury switches. A threshold value of 0 represents 0 Ohm impedance and a value of 100 represents 10 K Ohm impedance in this instance. The four bands defined by the three thresholds can be designated Band 0 to Band 3.

Each SI device 16 broadcasts its band status on the data bus 15 such that all other modules in the system are informed. The band status may only be broadcast when band status changes in order to minimise traffic on the data bus. The use of bands enables data traffic volume to be limited also.

There may be one or a number of responsive devices 12, 13, 14 in a particular system 10 and each SI device 16 can be assigned to affect none, some or all of them. The number assigned to a given responsive device 12, 13, 14 will depend on the responsive device in question. For example, up to five SI devices 16 can be assigned to influence the action of the power module 13 in the following manner:

Assign Source A=SI $v$
Assign Source B=SI $w$
Assign Source C=SI $x$
Assign Source D=SI $y$
Assign Source E=SI $z$ where $v$, $w$, $x$, $y$ and $z$=2 to 33.

Such an assignment gives the power module 6 separate control influences which can be used, for example, to tailor operation to limit the speed of a vehicle, such as a wheelchair.

Figure 2:
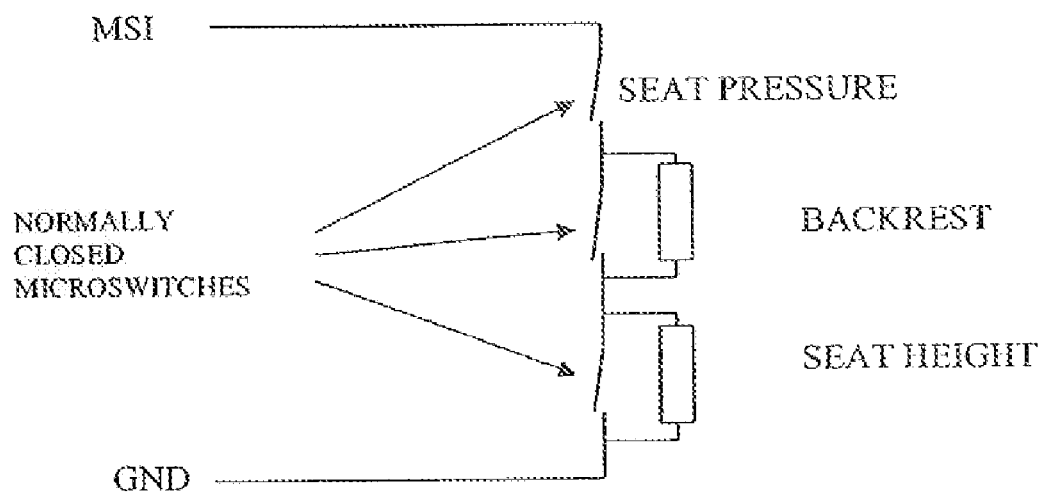
FIG. 2 is a circuit diagram illustrating an embodiment of an external arrangement for connection to a status indicating device in a system according to the present invention.

The use of control bands allows a user to tailor the system 10 to their requirements and further provides relatively complex functions with the minimum of hardware. Data traffic is also reduced when compared with other systems. For example, a wheelchair 20 (FIG. 3) requiring half-speed if seat 22 is high, half-speed if backrest 24 is reclined, quarter-speed if seat is high and backrest is reclined and full inhibit if seat is unoccupied could be achieved with just one SI device, as shown in FIG. 2. It can be seen from FIG. 2 that if the seat is unoccupied then the circuit will be open, thereby isolating the controller device 11 and preventing any movement of the wheelchair 20.

Another example of potential use, is to allow a user to program seat positions which slows down or inhibits the wheelchair. This can be achieved by connecting a potentiometer to a SI device 16 and allowing the user to program the thresholds of electrical impedance to suit the preferred requirements.

The use of SI devices 16 provide a highly flexible, capable system. A primary feature is that responsive devices designed in the future will interface into an existing system with the same degree of capability.

The invention has been described in specific embodiments and passenger devices such as wheelchairs have been referred to. It should be understood that the invention has wider applicability than these specific examples of use.

The invention claimed is:

1. An electronic system for an electrically-powered wheelchair comprising:
a communication network;
a user input controller device for receiving user input, the user input controller device coupled to the communication network;
at least two controller responsive devices operating in respective response modes of operation controlled by the user input controller device, each controller responsive device used in operating the wheelchair, wherein the at least two controller responsive devices are coupled to the communication network; and
at least one status indicating device for providing a control status output based on at least one input indicative of operational status of the wheelchair, the control status output representing one of a predetermined plurality of different output modes, wherein the at least one status indicating device is coupled to the communication network;
wherein the at least one status indicating device is configured to broadcast said control status output to the at least two controller responsive devices over the communication network of the electronic system without involvement of the user input controller device;
wherein the respective response modes of operation of the at least two controller responsive devices is influenced by the control status output communicated from the at least one status indicating device to thereby control operation of the wheelchair;
wherein said control status output generated by a given status indicating device represents a selected one of a plurality of different predetermined user-programmable status bands for the given status indicating device, and the at least one status indicating device broadcasts the control status output over the communication network only when a change occurs between user-programmable status bands for the status indicating device in order to limit communication traffic on the communication network; and
wherein the at least two controller responsive devices include a power module that controls the supply of motive power to the wheelchair, and the power module is adapted to vary motive power of the wheelchair in response to the control status output communicated from the at least one status indicating device.

2. An electronic system according to claim 1, wherein:
the user-programmable status bands for the given status indicating device are dictated by impedance externally connected across the given status indicating device.

3. An electronic system according to claim 1, wherein:
the at least one status indicating device is separate and distinct from the at least two controller responsive devices of the electronic system.

4. An electronic system according to claim 1, wherein:
the user-programmable status bands correspond to a plurality of discrete status levels.

5. An electronic system according to claim 4, wherein:
the discrete status levels are defined by at least one of upper thresholds and lower thresholds.

6. An electronic system according to claim 1, wherein:
one or more status indicating devices of the electronic system have their respective control status output assigned to a group of controller responsive devices.

7. An electronic system according to claim 1, wherein:
the communication network comprises a bus providing for broadcast communication of said control status output to the at least two controller responsive devices.

8. An electronic system according to claim 1, wherein:
the communication network comprises a wireless communication system for broadcast communication of said control status output to the at least two controller responsive devices.

9. An electronic system according to claim 1, wherein:
the wheelchair has an adjustable seat, an adjustable back, and a speed control, the response mode of operation provides for control of at least one of a configuration and a motive operation of the wheelchair, wherein said configuration of the wheelchair comprises a configuration of at least one of said adjustable seat and said adjustable back, and said motive operation of the wheelchair comprises a velocity of the wheelchair.

10. An electrically-powered wheelchair comprising:
a plurality of wheels; and
an electronic system including
i) a communication network;
ii) a user input controller device for receiving user input, the user input controller device coupled to the communication network;
iii) at least two controller responsive devices operating in respective response modes of operation controlled by the user input controller device, each controller responsive device used in operating the wheelchair wherein the at least two controller responsive devices are coupled to the communication network; and
iv) at least one status indicating device for providing a control status output based on at least one input indicative of operational status of the wheelchair, the control status output representing one of a predetermined plurality of different output modes, wherein the at least one status indicating device is coupled to the communication network;
wherein the at least one status indicating device is configured to broadcast said control status output to the at least two controller responsive devices over the communication network of the electronic system without involvement of the user input controller device;
wherein the respective response modes of operation of the at least two controller responsive devices is influenced by the control status output communicated from the at least one status indicating device to thereby control operation of the wheelchair;

wherein said control status output generated by a given status indicating device represents a selected one of a plurality of different predetermined user-programmable status bands for the given status indicating device, and the at least one status indicating device broadcasts the control status output over the communication network only when a change occurs between user-programmable status bands for the status indicating device in order to limit communication traffic on the communication network; and wherein the at least two controller responsive devices include a power module that controls the supply of motive power to the wheelchair, and the power module is adapted to vary motive power of the wheelchair in response to the control status output communicated from the at least one status indicating device.

11. An electrically-powered wheelchair according to claim 10, wherein:
said response mode of operation controls motive operation of said plurality of wheels.

12. An electrically-powered wheelchair according to claim 10, wherein:
the wheelchair has an adjustable seat, an adjustable back, and a speed control, the response mode of operation provides for control of at least one of a configuration and a motive operation of the wheelchair, wherein said configuration of the wheelchair comprises a configuration of at least one of said adjustable seat and said adjustable back, and said motive operation of the wheelchair comprises a velocity of the wheelchair.

13. A method of controlling an electrically-powered wheelchair, the wheelchair including a user input controller device for receiving user input, at least two controller responsive devices, at least one status indicating device associated with the at least two controller responsive devices, and a communication network, the method comprising:

operating the at least two controller responsive devices in respective response modes of operation controlled by the user input controller device, each controller responsive device used in operating the wheelchair, wherein the user input controller device and the at least two controller responsive devices are coupled to the communication network to provide for communication between the user input controller device and the at least two controller responsive devices;

a given status indicating device generating a control status output based on at least one input indicative of operational status of the vehicle, the control status output for influencing the respective response modes of operation of the at least two controller responsive devices associated therewith; and broadcasting the control status output generated by the given status indicating device over the communication network to communicate the control status output to the at least two controller responsive devices without involvement of the user input controller device for influence of the respective response modes of operation of the at least two controller responsive devices associated therewith to thereby control operation of the wheelchair;

wherein said control status output generated by a given status indicating device represents a selected one of a plurality of different predetermined user-programmable status bands for the given status indicating device, and the at least one status indicating device broadcasts the control status output over the communication network only when a change occurs between user-programmable status bands for the status indicating device in order to limit communication traffic on the communication network; and wherein the at least two controller responsive devices include a power module that controls the supply of motive power to the wheelchair, and the power module is adapted to vary motive power of the wheelchair in response to the control status output communicated from the at least one status indicating device.

14. A method according to claim 13, wherein:
the wheelchair includes a plurality of wheels; and
said response mode of operation controls motive operation of said plurality of wheels.

15. A method according to claim 13, wherein:
the wheelchair has an adjustable seat, an adjustable back, and a speed control, the response mode of operation provides for control of at least one of a configuration and a motive operation of the wheelchair, wherein said configuration of the wheelchair comprises a configuration of at least one of said adjustable seat and said adjustable back, and said motive operation of the wheelchair comprises a velocity of the wheelchair.

16. An electronic system according to claim 1, wherein:
the at least two controller responsive devices further include a seat module that configures a seating arrangement of the wheelchair, the at least one status indicating device generates a control status output according to configuration of the seating arrangement by the seat module, and the power module is adapted to vary motive power of the wheelchair in response to such control status output.

17. An electronic system according to claim 1, wherein:
the at least two controller responsive devices further include a seat module that configures a seating arrangement of the wheelchair, the seating arrangement having an adjustable height and an adjustable backrest, the at least one status indicating device generates a control status output according to configuration of the height and the backrest of the seating arrangement by the seat module, and the power module is adapted to vary motive power of the wheelchair in response to such control status output.

18. An electronic system according to claim 1, wherein:
the user input controller device is a joystick controller device.

19. An electronic system for an electrically-powered wheelchair comprising:
a communication network;
a user input controller device for receiving user input, the user input controller coupled to the communication network;
at least two controller responsive devices operating in respective response modes of operation controlled by the user input controller device, each controller responsive device used in operating the wheelchair, wherein the at least two controller responsive devices are coupled to the communication network; and
at least one status indicating device for providing a control status output based on at least one input indicative of operational status of the wheelchair, the control status output representing one of a predetermined plurality of different output modes, wherein the at least one status indicating device is coupled to the communication network;
wherein the at least one status indicating device is configured to broadcast said control status output to the at least two controller responsive devices over the communication network of the electronic system without involvement of the user input controller device;

wherein the respective response modes of operation of the at least two controller responsive devices is influenced by the control status output communicated from the at least one status indicating device to thereby control operation of the wheelchair;

wherein said control status output generated by a given status indicating device represents a selected one of a plurality of different predetermined user-programmable status bands for the given status indicating device, and the at least one status indicating device broadcasts the control status output over the communication network only when a change occurs between user-programmable status bands for the status indicating device in order to limit communication traffic on the communication network; and wherein the at least two controller responsive devices include a seat module adapted to modify configuration of a seating arrangement of the wheelchair in response to the control status output communicated from the at least one status indicating device.

* * * * *